(12) United States Patent
Johansson

(10) Patent No.: US 11,428,526 B2
(45) Date of Patent: Aug. 30, 2022

(54) ESTIMATION OF ABSOLUTE WHEEL ROLL RADII AND ESTIMATION OF VERTICAL COMPRESSION VALUE

(71) Applicant: NIRA Dynamics AB, Linköping (SE)

(72) Inventor: Robert Johansson, Linköping (SE)

(73) Assignee: NIRA Dynamics AB, Linköping (SE)

( * ) Notice: Subject to any disclaimer, the term of this patent is extended or adjusted under 35 U.S.C. 154(b) by 847 days.

(21) Appl. No.: 16/330,756

(22) PCT Filed: Aug. 18, 2017

(86) PCT No.: PCT/EP2017/025234
§ 371 (c)(1),
(2) Date: Mar. 5, 2019

(87) PCT Pub. No.: WO2018/046136
PCT Pub. Date: Mar. 15, 2018

(65) Prior Publication Data
US 2019/0226841 A1     Jul. 25, 2019

(30) Foreign Application Priority Data

Sep. 6, 2016    (DE) ........................ 102016010750.2

(51) Int. Cl.
*G01B 21/32*      (2006.01)
*B60C 23/06*      (2006.01)
(Continued)

(52) U.S. Cl.
CPC ............ *G01B 21/32* (2013.01); *B60C 23/061* (2013.01); *B60T 8/17551* (2013.01);
(Continued)

(58) Field of Classification Search
CPC ... B60T 8/17551; B60W 40/12; B60W 40/13; G01B 21/32; G01B 21/12
(Continued)

(56) References Cited

U.S. PATENT DOCUMENTS

| 4,607,436 | A  | * | 8/1986 | Clay ...................... G01B 3/006 D10/73 |
| 6,237,234 | B1 | * | 5/2001 | Jackson ................. G01B 11/08 33/555.1 |

(Continued)

FOREIGN PATENT DOCUMENTS

| CN | 102951135 A | 3/2013 |
| DE | 10024178 A1 | 12/2001 |

(Continued)

OTHER PUBLICATIONS

China National Intellectual Property Administration, Office Action, CN Application No. 201780054765.5, dated May 29, 2020, 7 pages.
(Continued)

*Primary Examiner* — George B Bennett
(74) *Attorney, Agent, or Firm* — Mahamedi IP Law LLP

(57) ABSTRACT

Methods, apparatuses and computer program products for estimating absolute wheel roll radii and/or a vertical compression value of wheels of a vehicle are disclosed, wherein yaw rates of the vehicle, wheel speeds of first and second wheels, and optionally lateral acceleration of the vehicle are measured and used as a basis for the estimation.

15 Claims, 8 Drawing Sheets

Figure 1:
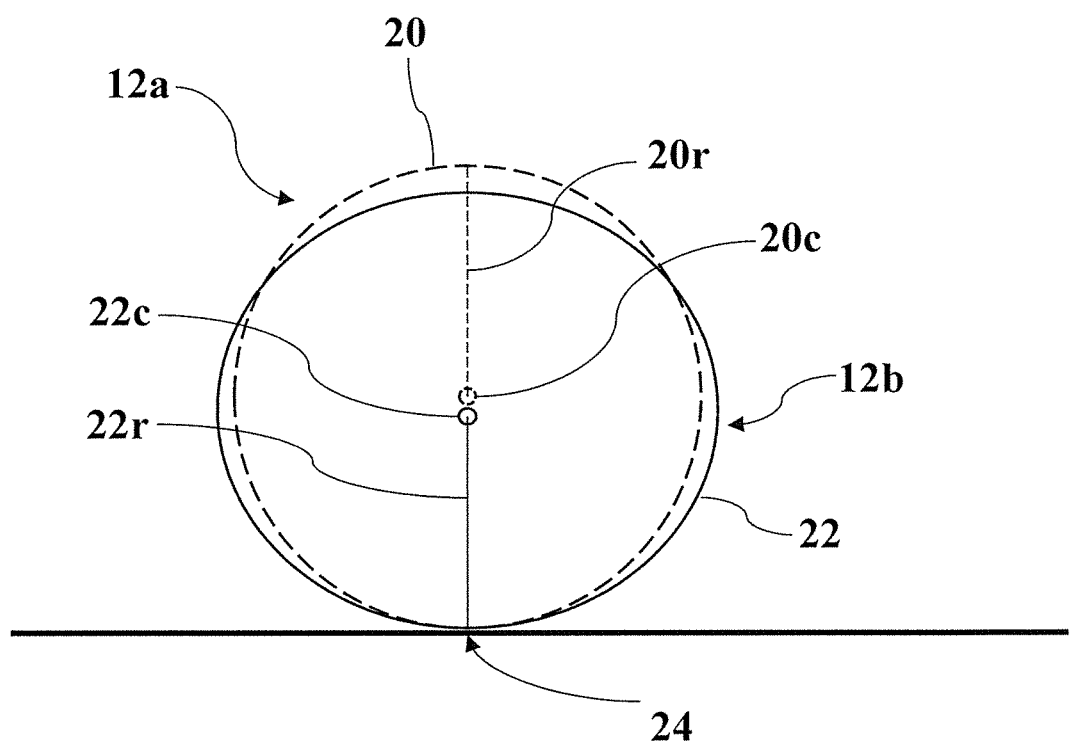

(51) Int. Cl.
   *B60T 8/1755*  (2006.01)
   *B60W 40/12*  (2012.01)
   *B60W 40/13*  (2012.01)
   *G01B 21/12*  (2006.01)
   *G01G 19/08*  (2006.01)

(52) U.S. Cl.
   CPC ............ *B60W 40/12* (2013.01); *B60W 40/13* (2013.01); *G01B 21/12* (2013.01); *B60T 2240/06* (2013.01); *G01G 19/086* (2013.01)

(58) Field of Classification Search
   USPC .......................................................... 33/203
   See application file for complete search history.

(56) References Cited

U.S. PATENT DOCUMENTS

| | | | |
|---|---|---|---|
| 6,834,222 | B2 | 12/2004 | Lu et al. |
| 6,834,543 | B2* | 12/2004 | Kin .................. B60C 23/061 73/146 |
| 9,752,962 | B2* | 9/2017 | Singh .................. B60T 8/172 |
| 10,378,159 | B2* | 8/2019 | Svantesson .............. G01C 7/04 |
| 11,298,991 | B2* | 4/2022 | Singh .................... B60C 23/064 |
| 2003/0010108 | A1 | 1/2003 | Goslar et al. |
| 2003/0172728 | A1 | 9/2003 | Gustaafsson et al. |
| 2004/0172181 | A1 | 9/2004 | Lu et al. |
| 2010/0318308 | A1 | 12/2010 | Gustavsson et al. |
| 2011/0288718 | A1 | 11/2011 | Wada |
| 2019/0193723 | A1* | 6/2019 | Sunahara ............ B60T 8/17555 |
| 2020/0238770 | A1* | 7/2020 | Karlsson ................ G07C 5/006 |
| 2020/0250899 | A1* | 8/2020 | Sakakibara ........... B60T 8/1725 |

FOREIGN PATENT DOCUMENTS

| | | |
|---|---|---|
| DE | 102004035579 A1 | 2/2006 |
| DE | 102006020490 A1 | 8/2007 |
| DE | 102007037513 A1 | 3/2008 |
| DE | 102007029870 A1 | 1/2009 |
| DE | 102008026370 B4 | 8/2011 |
| DE | 102013004900 A1 | 9/2014 |
| EP | 2390117 A2 | 11/2011 |
| JP | 2008241462 A | 10/2008 |
| JP | 2008302848 A | 12/2008 |

OTHER PUBLICATIONS

German Patent and Trademark Office, Office Action, DE Application No. 102016010750.2, dated Apr. 13, 2017, 7 pages.
German Patent and Trademark Office, Office Action, DE Application No. 102016010750.2, dated Jan. 10, 2018, 5 pages.
German Patent and Trademark Office, Office Action, DE Application No. 102016015810.7, dated Apr. 7, 2021, 5 pages.
PCT International Search Report and Written Opinion, Application No. PCT/EP2017/025234, dated Dec. 20, 2017, 13 pages.

* cited by examiner

ESTIMATION OF ABSOLUTE WHEEL ROLL RADII AND ESTIMATION OF VERTICAL COMPRESSION VALUE

TECHNICAL FIELD

The present invention generally relates to estimating wheel roll radii of wheels of a vehicle and estimating a vertical compression value of wheels of a vehicle.

BACKGROUND OF THE INVENTION

For purposes of comfort and safety, cars include a variety of monitoring and stability systems, which detect and potentially control current driving characteristics ranging from engine to tire conditions. Tire or wheel conditions, such as pressure monitoring, loose wheel detection or tire stiffness determination, are of particular interest because the tires and wheels form the main point of contact with the road and are subject to strenuous wearing forces.

Roll radius estimates have emerged as a valuable tool in the monitoring of tire or wheel conditions. In particular, relative roll radius estimation aims at identifying deviations from a nominal or reference value. In contrast, absolute roll radius estimation aims at identifying the actual absolute value of the roll radius.

For instance, from U.S. Pat. No. 6,834,222, a system for tire imbalance detection is known, wherein relative roll radii are estimated based on vehicle velocity. Vehicle velocity is determined from angular wheel speed sensors via a roll radius. However, if the absolute wheel roll radius is not known, such determination is error-prone and subject to systemic determination errors. Furthermore, such method requires accurate knowledge of the nominal or reference value for relative radius estimation.

In other approaches, vehicle velocity determined by GPS signals may be used as a basis for roll radius estimates. This approach may be practiced if GPS equipment is present, which is not the case in all vehicles.

Further, tire stiffness is a variable of tire conditions with effects in tire pressure monitoring and wheel classification. A common problem in data processing of tire conditions is the interaction of these variables. For instance, a roll radius change depends on both tire pressure and tire stiffness. Therefore, it is of great interest to estimate compression constants concurrently with or independently from roll radius estimates.

Therefore, it is an object of the present invention to provide enhanced solutions for an estimation or determination of parameters of wheels of a vehicle, particularly for estimation or determination of absolute wheel roll radii of wheels of a vehicle and estimation or determination of a vertical compression value of wheels of a vehicle.

SUMMARY OF THE INVENTION

Methods, apparatuses and computer program products are disclosed.

In a first aspect, a method of estimating absolute wheel roll radii of wheels of a vehicle is disclosed. The method comprises measuring at least two yaw rate signals, each indicative of a yaw rate of the vehicle. The method comprises measuring at least two first wheel speed signals, each indicative of an angular velocity of a first wheel of the vehicle, as well as measuring at least two second wheel speed signals, each indicative of an angular velocity of a second wheel of the vehicle. Based on the measured yaw rate signals, the measured first wheel speed signals and the measured second wheel speed signals, a first absolute wheel roll radius of the first wheel and a second absolute wheel roll radius of a second wheel is determined.

In some examples, the first wheel and the second wheel may be rear wheels. Such arrangement may be referred to as a rear arrangement. For instance, the first wheel may be a rear left wheel and the second wheel may be a rear right wheel or vice versa.

Alternatively, the first wheel and the second wheel may be front wheels (referred to as front arrangement) or may be a combination of the preceding, e.g. the first wheel may be a front wheel and the second wheel may be a rear wheel or vice versa. For instance, if the first wheel and second wheel are located at a same side of the vehicle, the arrangement may be referred to as a (left or right) side arrangement. Alternatively, if the first wheel and second wheel are located at opposite sides of the vehicle, the arrangement may be referred to as diagonal arrangement.

Moreover, each of the wheels may be a driven or a non-driven wheel. Each of the wheels may be a turning or a non-turning wheel.

Throughout this description, the method will be described in general and may be applied to any combination of wheel arrangement as well as driven or non-driven and turning or non-turning wheels. However, for some arrangements (e.g. front arrangement, diagonal arrangement, driven wheel arrangement, turning wheel arrangement etc.) particular embodiments may be preferred, which take into account the particular arrangement. For illustration purposes in the present description, unless otherwise noted the first wheel may be referred to as a (rear) left wheel and the second wheel may be referred to as a (rear) right wheel.

In some examples, the determining may be based on a particular relationship between the measured signals. For instance, the relationship may be expressed as:

$$\dot{\Psi}_m = \frac{r_l \omega_l - r_r \omega_r}{B} + K$$

wherein $\dot{\Psi}_m$ denotes a yaw rate, $r_l$ denotes a first absolute wheel roll radius, $r_r$ denotes a second absolute wheel roll radius, $\omega_l$ denotes a first wheel speed, $\omega_r$ denotes a second wheel speed, B denotes an axle width, and K donates an offset constant.

In general, as mentioned above, a method of estimating absolute wheel roll radii according to the first aspect comprises at least two measurements for each type of signal, namely at least two yaw rate signals, at least two first wheel speed signals, and at least two second wheel speed signals. However, in some embodiments, more measurements may be carried out. In case a particular relationship between the measured signals is used, the number of measurements for each signal may depend on the number of unknowns in the relationship. For instance, if the first absolute wheel roll radius, the second absolute wheel roll radius and the offset constant are unknown, at least three measurements may be carried out.

The axle width B may correspond to the width of an axle connecting the first and second wheels. For instance, in the case of a rear arrangement, such as the first wheel being a first rear wheel (e.g. rear left) and the second wheel being a second rear wheel (e.g. rear right), the axle width may be the width of the rear axle. In the case of a front arrangement, the axle with may be the width of the front axle. In some examples, the axle width may be the actual width of an axle or an effective axle width. An effective axle width may for instance be defined as an orthogonal distance between directional vectors describing the orientations of the first and second wheels. In the case of wheels, which are not turning, the effective axle width may be identical to the actual or physical axle width. In the case of turning wheels, the effective axle width may correspond to the product of actual axle width and cosine of the turning angle.

The offset constant K may be used to catch offsets in one or more of the signals. For example, the offset constant may be used to catch an offset in the yaw rate signal. To at least partially compensate for a potential bias of the yaw rate sensor in its measurement, the offset constant K may be set to the value of this bias, $\dot{\Psi}_{Error}$:

$$\dot{\Psi}_m = \dot{\Psi} + \dot{\Psi}_{Error} = \frac{r_l \omega_l - r_r \omega_r}{B} + \dot{\Psi}_{Error}$$

In some examples, e.g. in the case of negligible measurement errors, the offset constant may be set to zero, K=0.

In some examples, the method may comprise measuring at least two lateral acceleration signals, each indicative of a lateral acceleration of the vehicle. The determining may be based on a wheel compression value and the measured lateral acceleration signals indicating a lateral acceleration of the vehicle.

For instance, lateral acceleration may be measured using an accelerometer of the vehicle.

In particular, if lateral acceleration signals are measured, the methods may be based the determining on the relationship $$\dot{\Psi}_m = \frac{(r_l - a_y C)\omega_l - (r_r + a_y C)\omega_r}{B} + K,$$

wherein $\dot{\Psi}_m$ denotes a yaw rate, $r_l$ denotes a first absolute wheel roll radius, $r_r$ denotes a second absolute wheel roll radius, $\omega_l$ denotes a first wheel speed, $\omega_r$ denotes a second wheel speed, B denotes an axle width (e.g. width of an axle connecting the first and second wheels), $a_y$ denotes a lateral acceleration of the vehicle, C denotes a wheel vertical compression value and K donates an offset constant.

The vertical compression value C may also be denoted as a vertical compression ratio constant. In general, a vertical compression of the wheels (i.e. a decrease in absolute roll radius) may be considered proportional to a vertical force generating the compression. A vertical compression value may be indicative of this proportionality.

A lateral acceleration of the vehicle (e.g. during cornering) generates a load difference between the wheels. The vertical compression value C may be defined as a proportionality constant between lateral acceleration and a further change in absolute roll radius.

In particular C may correspond to $$C = \frac{mHC'}{2B},$$

wherein in is the mass of the vehicle, H is the height of the center of gravity, B is the axle width and C' is the nominal compression constant of each wheel. The nominal compression constant may be given by the relationship $$\Delta r = C' \times F$$

wherein Δr denotes a change in absolute roll radius and F denotes a vertical force.

The vertical compression value may be predetermined or may be received by the method from another source or may be estimated by the method itself.

An example of receiving a vertical compression value from another source may comprise combining a relative roll radius estimate with a vehicle load measurement. Upon a known load change in the vehicle, an estimate of the relative roll radius change (that corresponds to this load change) allows to estimate a vertical compression value.

The vertical compression value may be estimated by the method. For instance, at least three yaw rate signals may be measured, at least three first wheel speed signals may be measured at least three second wheel speed signals may be measured and at least three lateral acceleration signals may be measured. The determining may then comprise determining a wheel compression value based on the measured yaw rate signals, the measured first wheel speed signals and the measured second wheel speed signals and the measured lateral acceleration signals, for instance according to:

$$\dot{\Psi}_m = \frac{(r_l - a_y C)\omega_l - (r_r + a_y C)\omega_r}{B} + K$$

wherein $\dot{\Psi}_m$ denotes a yaw rate, $r_l$ denotes a first absolute wheel roll radius, $r_r$ denotes a second absolute wheel roll radius, $\omega_l$ denotes a first wheel speed, $\omega_r$ denotes a second wheel speed, B denotes an axle width (in particular of an axle connecting the first and second wheels), $a_y$ denotes a lateral acceleration of the vehicle, C denotes a wheel compression value and K donates an offset constant.

The determining may be carried out without using a nominal wheel radius of a wheel of the vehicle. This may be used in order to not rely on the accuracy of the nominal wheel radius, e.g. due to a tire or wheel change.

The determining may comprise a statistical regression analysis, in particular a recursive estimation such as a Kalman filter or a batch analysis such as a least-squares-fit of a relationship between the measured signals.

The absolute roll radius of the second wheel can be computed based on the determined first absolute roll radius of the first wheel. The second absolute wheel roll radius may be determined based on the determined first absolute wheel roll radius and a proportionality factor. The proportionality factor may describe how one wheel relates to another and may be obtained by using a relative roll radius estimation method. In a tire pressure monitoring system, a variety of additional signals may be used for this purpose, including wheel speeds, yaw rate, engine torque, engine RPM, ambient temperature, braking flag, rear gear flag, ABS or traction control engaged flag, clutch flag, longitudinal acceleration and lateral acceleration.

The at least two yaw rate signals are measured as a time series, the at least two first wheel speed signals are measured as a time series, and the at least two second wheel speed signals are measured as a time series. The time series may preferably be synchronized in time with respect to each other, for example collected concurrently.

The determining may be carried out without using a velocity signal, indicative of the velocity of the vehicle, in particular without using a GPS signal. This may be used, for example, if the vehicle is not equipped with GPS equipment or no GPS information can be provided (e.g. by an external GPS equipment).

The method may comprise receiving at least one accessory signal from an accessory sensor and wherein the determining is based on the accessory signal(s). The accessory signal(s) may be indicative of at least one of the following:

engine torque, specific axle/wheel torque, wheel slip, Engine RPM, longitudinal acceleration, load of the vehicle, axle height, suspension pressure, ambient temperature, Steering wheel angle, a tire type, an estimated friction potential (such as from an ABS braking, from a TCS event, from vehicle connectivity), a normalized traction force on the wheel, a friction related value, a brake pressure, a tire pressure, a tire temperature, a suspension height, a control flag register.

A control flag register may indicate, for example, ESC control is in progress, ABS Braking is in progress, TCS is in progress, braking is in progress, a gear shift is in progress, the clutch pedal is engaged, a reverse gear is engaged, a trailer is connected, or a cruise control is engaged.

Uses of the above accessory signals include the following: Measured signals and/or results (e.g. determined radii and/or compression) may be disregarded upon the brake being engaged and/or in the case of an engaged reverse gear. Also, driving situations deviating from normal driving situations may be used as criterion to disregard measured signals and/or results. Such driving situations may include high lateral acceleration, high vehicle acceleration ("kick-start"), high vehicle deceleration ("hitting the brakes").

A sign of a measured wheel speed may be changed upon an engaged reverse gear. An accessory signal or flag indicative of an ABS or traction control being in progress may be used as turn-off criteria to minimize the effect of unknown wheel torques.

An accessory signal indicative of a longitudinal acceleration may be used analogously to the use of lateral acceleration as described above. A load of the vehicle could be estimated using an accessory signal indicative of at least one of longitudinal acceleration, axle height, and air suspension pressure. The obtained load estimate may also be used to obtain an estimate of an actual vertical compression constant as described above.

The above accessory signals may be used in the case of driven wheels: For instance, an accessory single indicative of engine torque or of specific axle/wheel torque may be used to take into account wheel slip. Wheel slip may be modeled separately or detected upon particularly high torque levels. Specifically for a driven wheel, engine RPM and wheel speed may be used to calculate a wheel specific torque. In addition or alternatively, an accessory signal indicative of a pressed clutch pedal may indicate that the torque signals are unreliable and should not be taken into account.

An accessory signal indicative of ambient temperature may be used to compensate for potential temperature effects in the vertical wheel compression constant.

For steering wheels, a signal indicative of a steering angle may be used to compute the effective reduction of axle width due to the wheel angles.

In a second aspect, a method of estimating a vertical compression value of a wheel of a vehicle is disclosed. It may comprise measuring a yaw rate signal, indicative of a yaw rate of the vehicle, measuring a first wheel speed signal, indicative of an angular velocity of a first wheel of the vehicle, measuring a second wheel speed signal, indicative of an angular velocity of a second wheel of the vehicle and measuring a lateral acceleration signal, indicative of a lateral acceleration of the vehicle. A first absolute wheel roll radius signal, indicative of an absolute wheel roll radius of the first wheel, and a second absolute wheel roll radius signal, indicative of an absolute wheel roll radius of the second wheel, are obtained. A vertical compression value of at least the first wheel may be determined on the basis of the measured yaw rate signals, the measured first wheel speed signals and the measured second wheel speed signals, the measured lateral acceleration signal and based on the obtained first absolute wheel roll radius of the first wheel and second absolute wheel roll radius of the second wheel.

For obtaining the first absolute wheel roll radius of the first wheel and second absolute wheel roll radius of the second wheel, the method may estimate absolute wheel roll radii of wheels of a vehicle. The first absolute wheel roll radius and the second absolute wheel roll radius may be estimated based on a method of estimating absolute wheel roll radii of wheels of a vehicle as disclosed herein.

The method of estimating absolute wheel roll radii and a vertical compression value of wheels of a vehicle may comprise the steps of a method according to the first aspect and the steps of a method according to the second aspect or a combination thereof.

In examples of methods for estimating a vertical compression value, the determining may be based on the relationship:

$$\dot{\Psi}_m = \frac{(r_l - a_y C)\omega_l - (r_r + a_y C)\omega_r}{B} + K$$

wherein $\dot{\Psi}_m$ denotes a yaw rate, $r_l$ denotes a first absolute wheel roll radius, $r_r$ denotes a second absolute wheel roll radius, $\omega_l$ denotes a first wheel speed, $\omega_r$ denotes a second wheel speed, B denotes an axle width, $a_y$ denotes a lateral acceleration, C denotes a wheel compression value and K donates an offset constant.

In a third aspect, a computer program product is disclosed, which includes program code configured to, when executed in a computing device, to carry out the steps of methods as disclosed herein.

In a fourth aspect, an apparatus to estimate absolute wheel roll radii and/or a vertical compression value of wheels of a vehicle is disclosed, which comprises a processing part, the processing part configured to carry out the steps of methods as disclosed herein.

SHORT DESCRIPTION OF THE DRAWINGS

The following detailed description refers to the appended drawings, wherein:

FIG. 1 schematically illustrates side views of wheels wherein nominal roll radius and absolute roll radius differ.

Figure 2A:
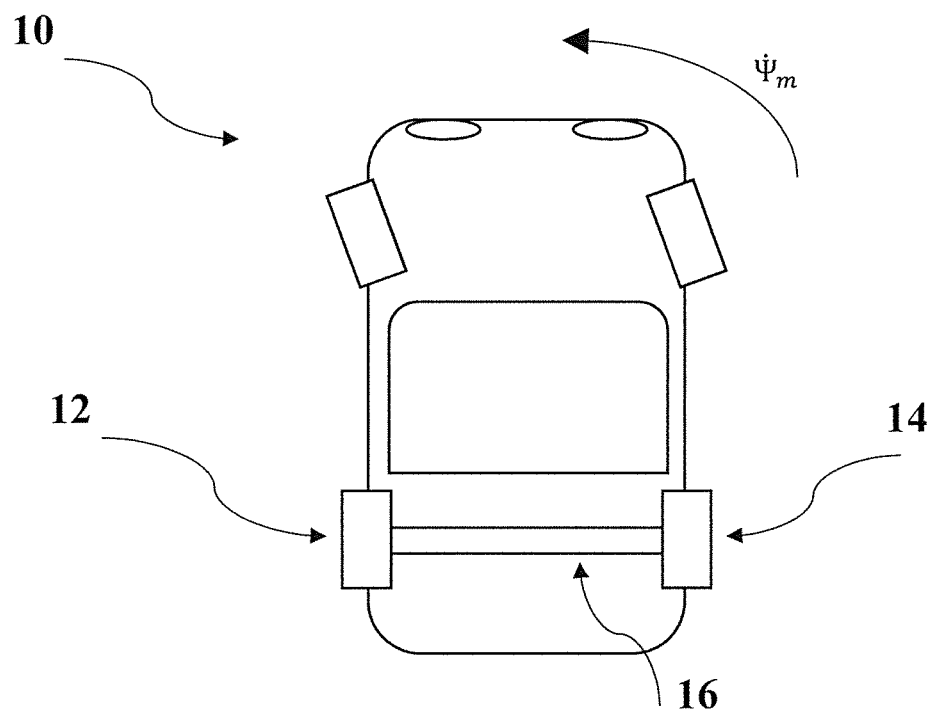

FIG. 2A schematically illustrates a top view of a vehicle during cornering, wherein methods according to embodiments may be applied.

Figure 2B:
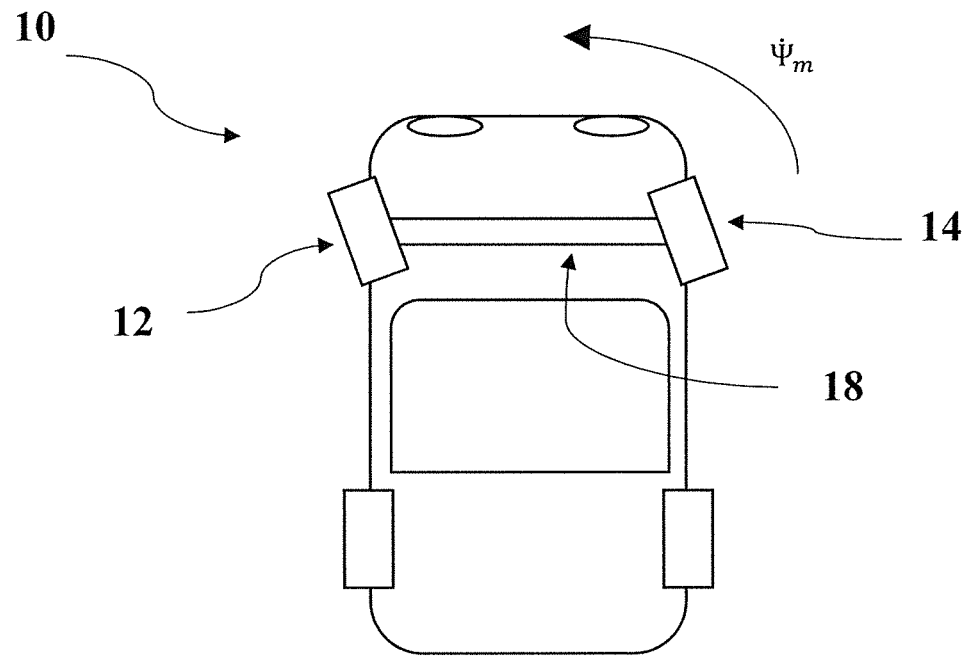

FIG. 2B schematically illustrates a further top view of a vehicle during cornering, wherein methods according to embodiments may be applied.

Figure 3:
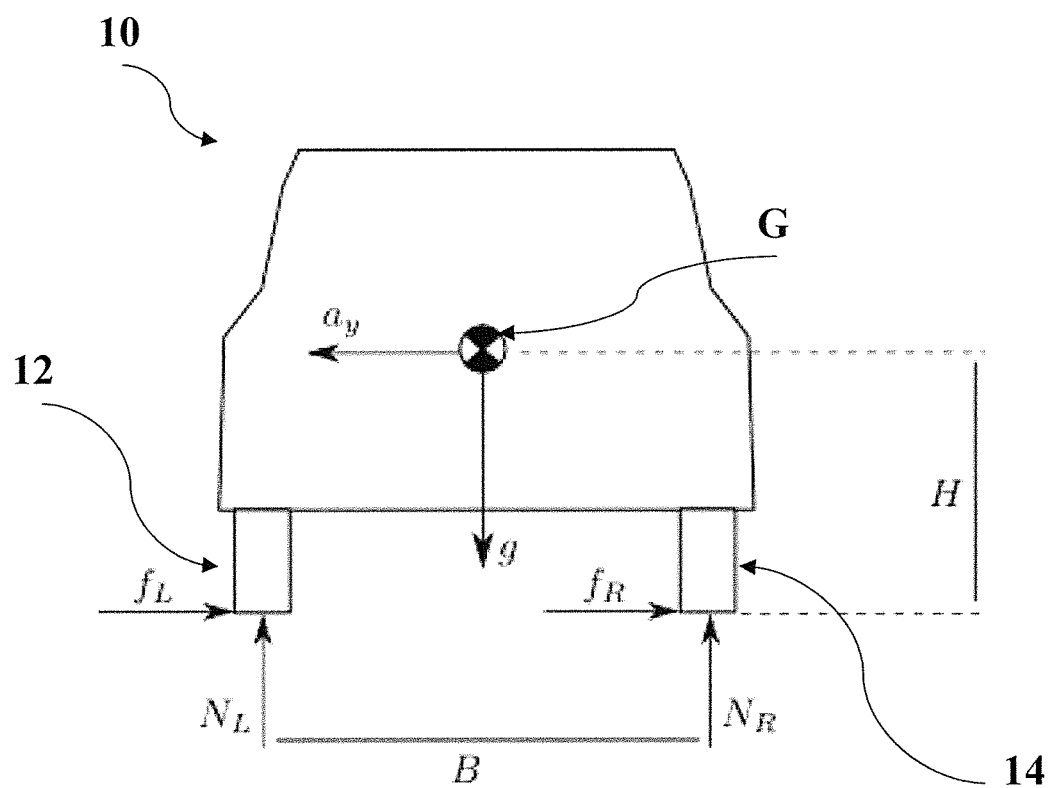

FIG. 3 schematically illustrates a back view of a vehicle during lateral acceleration, wherein methods according to embodiments may be applied.

Figure 4:
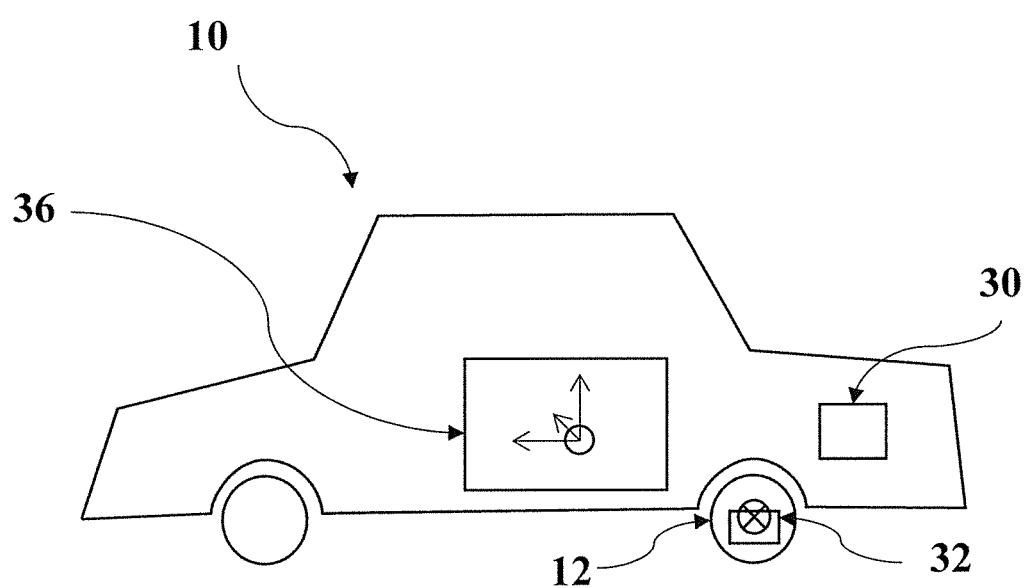

FIG. 4 schematically illustrates a side view of a vehicle comprising an apparatus according to embodiments.

Figure 5:
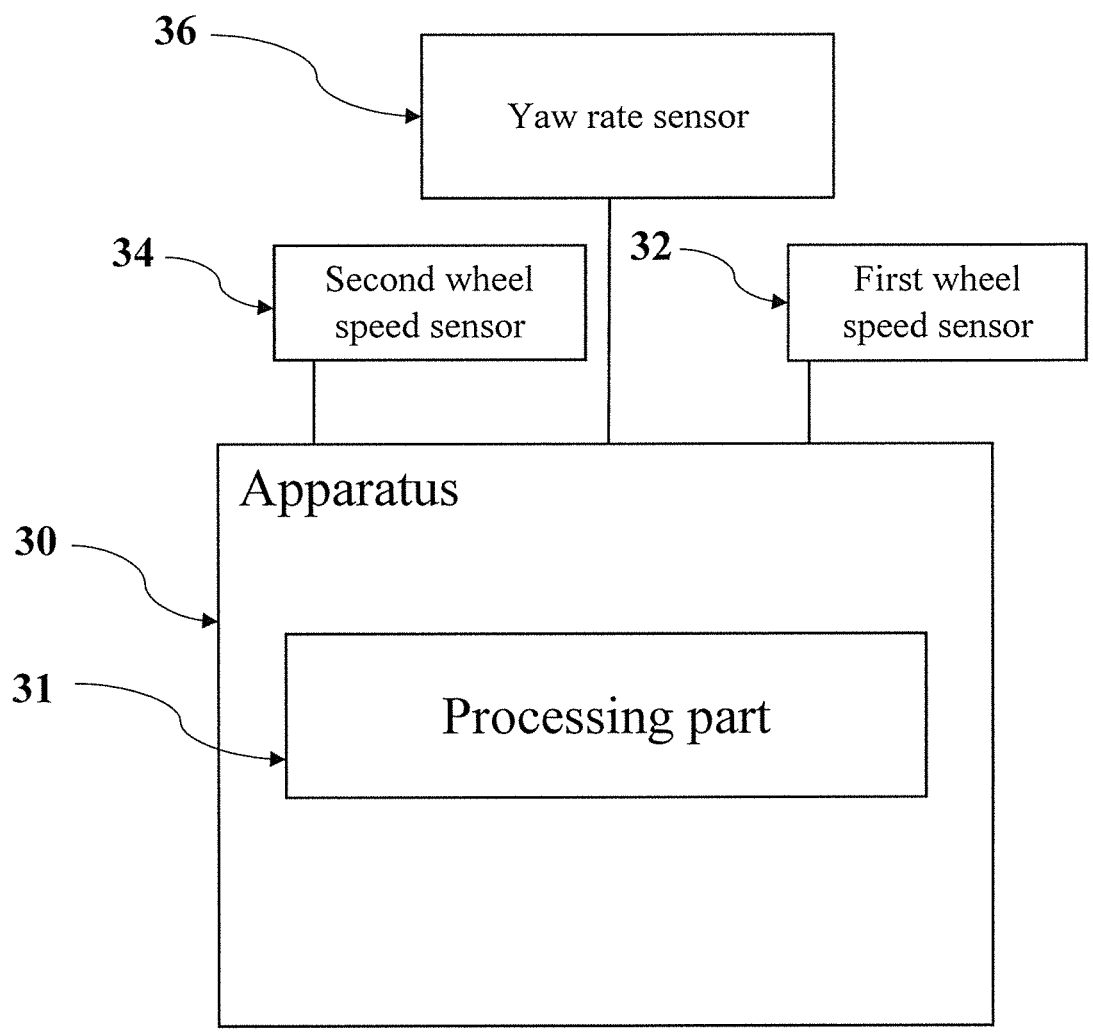

FIG. 5 schematically illustrates an apparatus according to embodiments.

Figure 6:
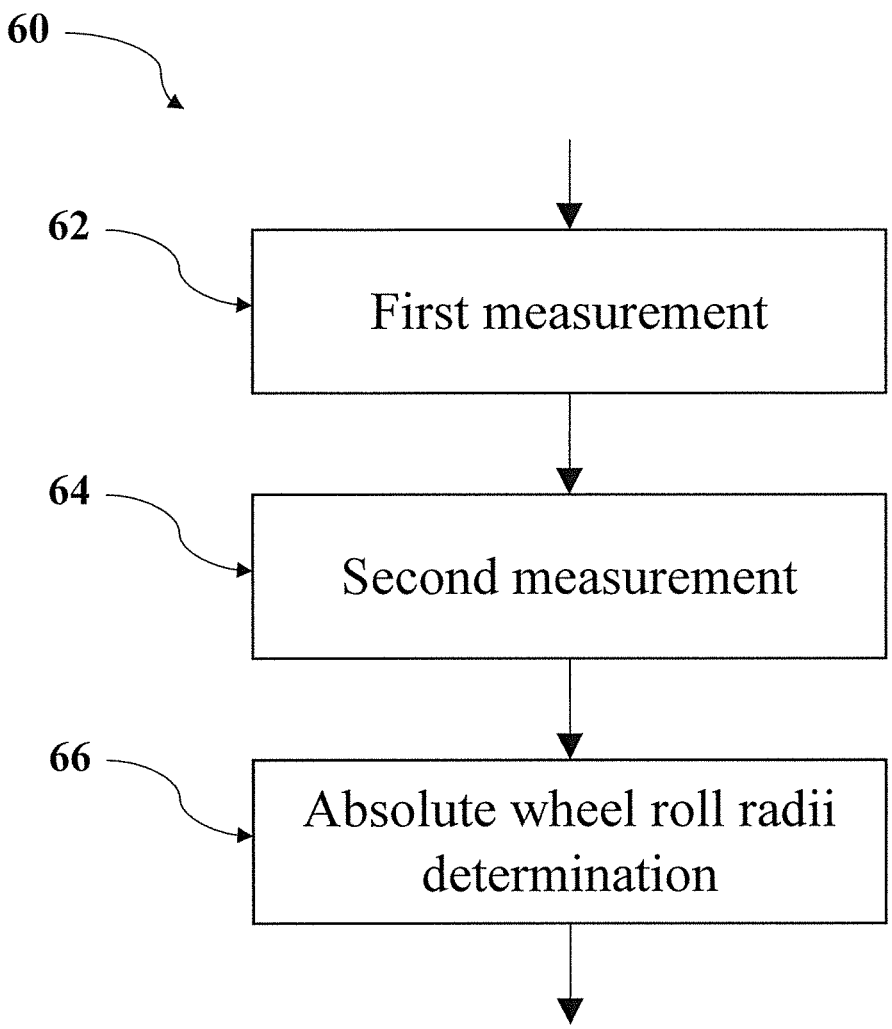
Figure 7:
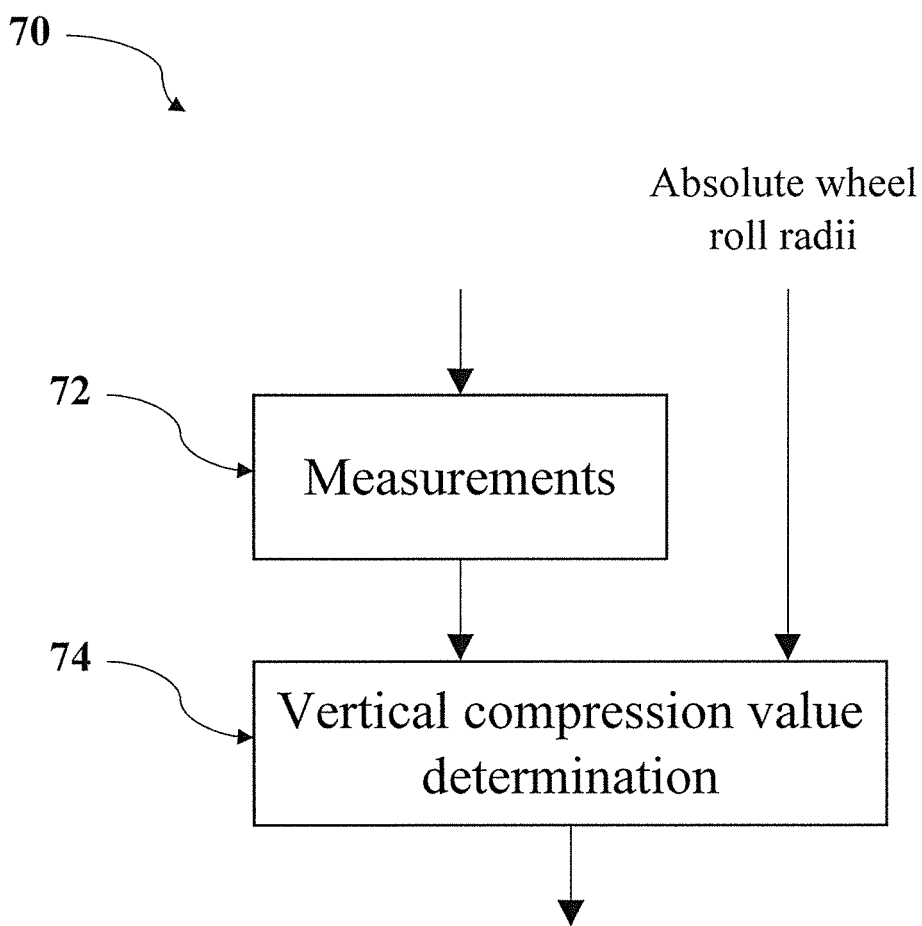
Figure 8:
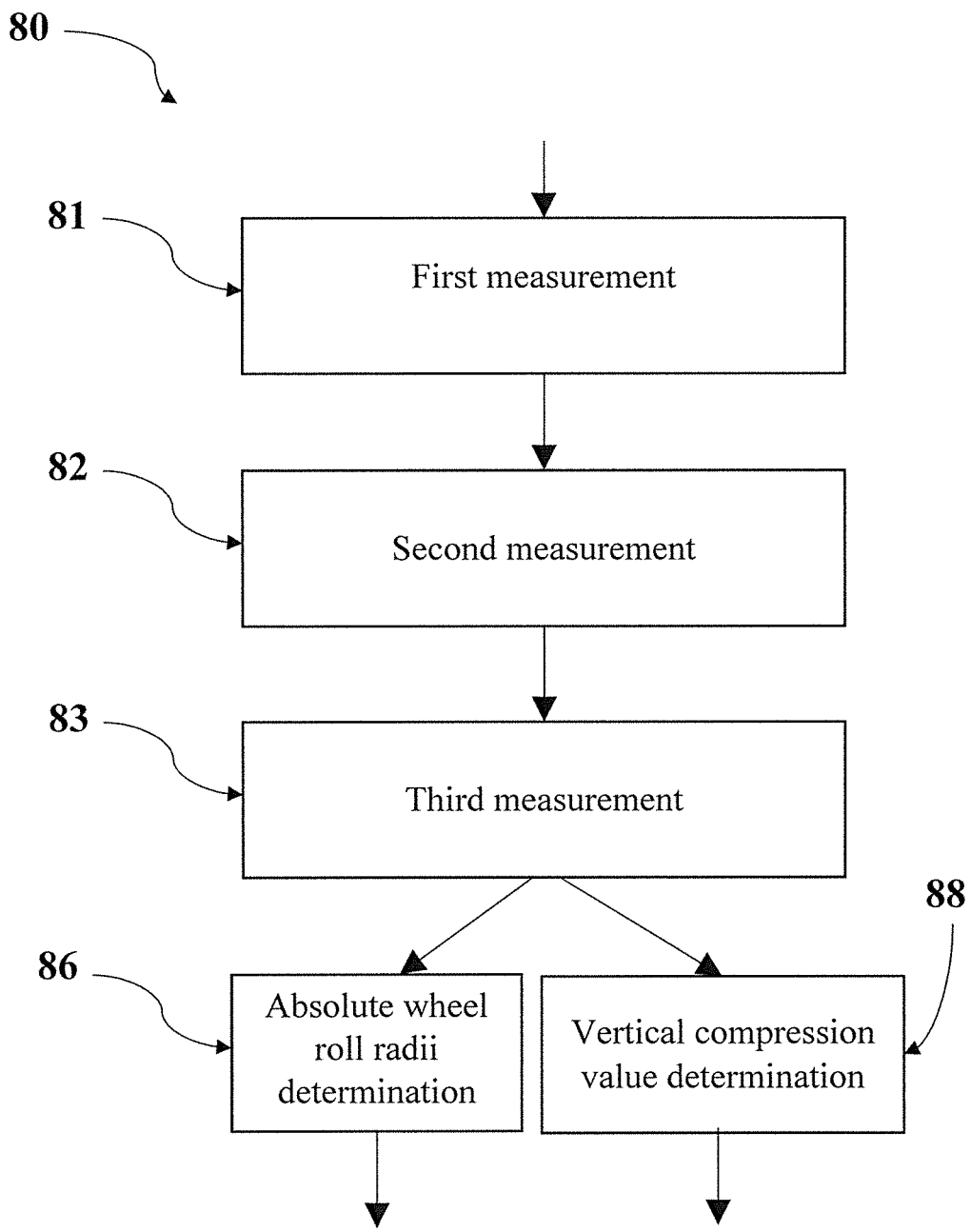

FIGS. 6 to 8 illustrate flow diagrams of methods according to embodiments.

DETAILED DESCRIPTION OF EMBODIMENTS

FIG. 1 schematically illustrates side views of wheels 12a and 12b, wherein the nominal roll radius 20r and the absolute roll radius 22r differ.

In dashed lines, a geometry of a wheel 12a without load or deformation is illustrated as having a shape 20 with radius 20r and center 20c. In general, a wheel comprises a tire and a rim, on which the tire is mounted. Without load and deformation, a wheel has a circular outer circumference.

The radius 20r of the wheel 12a can be referred to as "nominal radius" of the tire or of the wheel. In FIG. 1, the nominal radius 20r is illustrated by a dashed line directed vertically upwards from a geometric center 20c of wheel 12a.

Usually, a wheel may have an outer circumference that differs form a circular shape due to static parameters, e.g., fabrication tolerances of tire and/or rim, even material distribution in the tire material, defects in the tire's tread, etc. as well as due to dynamic parameters, e.g., resulting from driving conditions like load, partial deflation, friction forces, acceleration/deceleration of a vehicle the wheel is mounted on, etc. Such a wheel 12b is also illustrated in FIG. 1.

In continuous lines, a geometry of a wheel 12b is illustrated, which is has a form differing from that of wheel 12a. For illustration purposes, wheels 12a and 12b have been illustrated as having a common point of contact 24 with a road.

The shape of wheel 12b differs from the shape 20 of wheel 12a, e.g., due to load, a partial deflation, friction forces, acceleration and/or any other reasons (as those already mentioned above). As a result, the wheel 12b has a shape 22, which may be non-circular, as shown, e.g. elliptical, with respect to a geometric center 12c of wheel 12b. In the following, shape 22 is referred to as non-circular just as an example without limiting shape 22 to such a form.

An absolute roll radius 22r may be defined as the length between the center 22c of wheel 12b and a point of support 24, e.g. a point of contact with a road. Center 22c of wheel 12b may be, e.g., a center of gravity or a center of symmetry or a center of rotation for wheel 12b or any other reference point in relation to which an absolute roll radius 22r can be defined.

In the illustrated case, the absolute roll radius 22r is smaller than the nominal radius 20r.

The circular shape 20 and non-circular shape 22 are shown with a common point of contact 24 to the road. Due to the absolute roll radius 22r being smaller than the nominal radius 20r, the center 22c is located below center 20c.

FIGS. 2A and 2B schematically illustrate top views of vehicles during cornering. In FIGS. 2A and 2b, the front of the vehicle is located at the top of the figures.

In FIG. 2A, a vehicle 10 is shown, whose front wheels are inclined for a left-wards turn. A method according to the present invention may be applied to the driving condition of vehicle 10 in order to determine the absolute wheel roll radii of the rear wheels 12 and 14, connected by rear axle 16.

A yaw rate $\dot{\Psi}_m$ is measured using a yaw rate sensor (not shown), a wheel speed of the rear left wheel 12 is measured using a wheel speed sensor and a wheel speed of the rear right wheel 14 is measured using a wheel speed sensor. The wheel speeds are given as angular velocities and are not equivalent to the vehicle speed.

The measured values of yaw rate, rear left wheel speed and rear right wheel speed are considered to form a first set of measurements.

The measurements of the first set may be performed simultaneously or at least in a synchronized manner such that the measurements of the first set can be related or associated to each other. This also applies to further sets of measurement, such as the second set referred to further below.

The measured values of the first set are related via the relationship:

$$\dot{\Psi}_m = \frac{r_l \omega_l - r_r \omega_r}{B} + K$$

wherein $\dot{\Psi}_m$ denotes a yaw rate, $r_l$ denotes an absolute roll radius of the rear left wheel, denotes an absolute roll radius of the rear right wheel, $\omega_l$ denotes a rear left wheel speed, $\omega_r$ denotes a rear right wheel speed, B denotes the width of rear axle 16 (and is assumed to be known), and K donates an offset constant. For simplicity, in this embodiment, the sensors are assumed to have negligible errors and the offset constant K may be set to zero.

Further, second measurements are performed, yielding a second set of values for yaw rate, rear left wheel speed and rear right wheel speed.

The measured values of the second set are also related via the above relationship. Based on the two set of measurements and based on the above relationship, the absolute roll radii $r_l$ and $r_r$ of the rear left wheel 12 and of the rear right wheel 14, respectively, can be determined.

For increased reliability, the number of sets of measurements may be increased and statistical analysis may be performed.

A least-squares-fit batch analysis of a relationship between the measured signals may be performed.

It should be noted that, in this embodiment, the determining does not make use of a nominal wheel radius or of a velocity of the vehicle (such as determined from a GPS signal).

FIG. 2B illustrates a vehicle 10, wherein the method according to embodiments may be applied to the driving condition of vehicle 10 in order to determine the absolute wheel roll radii of the front wheels 12 and 14, connected by front axle 18. In the illustrated case, the front wheels 12 and 14 are the turning wheels of the vehicle.

In order to take into account that the angular velocities may be not parallel or may not have an orthogonally directed offset between them, a further compensation factor is included in the determination as will be described below.

An accessory signal indicative of a steering angle is received from an accessory sensor, such as a steering angle sensor, and the determining is based on the accessory signal. In particular, a steering angle may be used to compute the effective change of axle width due to the wheel angles. For instance, an effective axle width B' may be computed as:

$$B' = B \cos(\alpha)$$

wherein B is the actual axle width of the front axle 18, α denotes the steering angle measured with respect to straight driving.

In other embodiments, in addition to those illustrated in FIGS. 2A and 2B, further arrangements may be taken into account, including a comparison of wheels located on a same side of the vehicle (e.g. front left wheel and rear left wheel) or a comparison of wheels located diagonally to each other (e.g. front left wheel and rear right wheel).

As described with reference to FIG. 2B, lack of a orthogonally directed offset between the steering wheels with respect to the measured velocity can be at least partially corrected using a measured steering wheel angle allowing to estimate the lateral velocity (except for side slip) at the steering wheels. The lateral velocity at the non-steering wheels may be assumed to be zero (except for side slip). By using these lateral velocities and the wheel base as orthogonally directed offset, the methods as disclosed herein remain applicable.

The rear and front wheels of a same side could be used in the same manner as the axle wheels with the additional signal steering wheel angle and potentially with an estimate of lateral velocities due to side slip for increased precision.

For a comparison of diagonally located wheels, the method remains equally applicable. By using the steering angle the longitudinal velocity of the front wheel can be estimated and compared to the velocity of the rear wheel, which gives a good approximation (even without estimate of die slip) since the uncertainty of side slip is removed from the rear wheel and only exists on the front wheel and the side slip effect on the longitudinal velocity is smaller than on the lateral velocity.

FIG. 3 schematically illustrates a back view of a vehicle during lateral acceleration, illustrated by the acceleration vector $a_y$. In addition, gravity g acts on the vehicle 10 of mass m at its center of gravity G. The height of the center of gravity G is denoted with H. As a result, an upward-directed normal force and a sideward-directed friction force act on each wheel. In particular, a friction force $f_L$ and a normal force $N_L$ act on left wheel 12. Similarly, a friction force $f_R$ and a normal force $N_R$ act on right wheel 14. During lateral acceleration, these forces are not equal and generate a load difference, which leads to a difference in absolute roll radii at said wheels.

A lateral acceleration of the vehicle (e.g. during cornering) may generate a load difference between the wheels.

In the illustrated embodiment, the method comprises measuring a lateral acceleration signal, indicative of the lateral acceleration $a_y$ of the vehicle. The determining is based on a wheel compression value and the measured lateral acceleration signal.

The vertical compression value C may also be denoted as a vertical compression ratio constant and may be defined as the proportionality constant between lateral acceleration and a further change in absolute roll radius In general, a vertical compression of the wheels $\Delta r$ (i.e. a decrease in absolute roll radius) may be considered proportional to a vertical force F generating the compression with C' being the nominal compression constant of each wheel:

$$\Delta r = C' \times F$$

For the illustrated case of a leftward lateral acceleration, the normal forces on said two wheels can be expressed as $$N_L = \frac{mg}{4} + \frac{a_y mH}{2B} \text{ and}$$

$$N_R = \frac{mg}{4} - \frac{a_y mH}{2B}$$

This leads to a relative normal force difference on the axle of $$\frac{a_y mH}{B},$$

which gives rise to a further change in absolute roll radius $$\Delta r = \pm C' \times \frac{a_y mH}{2B} = a_y C,$$

with $$C = \frac{mHC'}{2B},$$

wherein m is the mass of the vehicle, H is the height of the center of gravity, B is the axle width and C' is the nominal compression constant of each wheel's tire. If the wheels differ in their nominal compression constant, an effective compression constant may be used.

Therefore, the relationship discussed with respect to the embodiments of FIG. 2A is adapted to recite the measured lateral acceleration and the compression value:

$$\dot{\Psi}_m = \frac{(r_l - a_y C)\omega_l - (r_r + a_y C)\omega_r}{B} + K$$

wherein $\dot{\Psi}_m$ denotes a yaw rate, $r_l$ denotes a left absolute wheel roll radius, $r_r$ denotes a right absolute wheel roll radius, $\omega_l$ denotes a left wheel speed, $\omega_r$ denotes a right wheel speed, B denotes the width of the axle connecting the left and right wheels, $a_y$ denotes a lateral acceleration of the vehicle, C denotes a wheel compression value and K donates an offset constant.

In cases, where the wheel compression value may differ for the left and right wheel, the above relationship may recite a left wheel compression value $C_l$ in the left wheel term and a right wheel compression value $C_r$ in the right wheel term.

The sign of $a_y$ in the above relationships may be adapted to the direction of acceleration.

The above relationships recite a vertical wheel compression value. Generally, this value may be known or unknown. In the former case, the method of estimating absolute wheel roll radii of wheels may take into account an external vertical compression value, i.e. which is predetermined or received from another source. An example of a predetermined vertical compression value is a register entry in the onboard electronics regarding the mass m of the vehicle, height H of the center of gravity, the nominal wheel compression constant C and the axle width B, each of which as designated by the manufacturer.

If the vertical compression value is not predetermined, it may be determined dynamically by another system of the vehicle and supplied as an input to the method of estimating absolute wheel roll radii as disclosed herein.

Alternatively, if the vertical compression value is considered unknown, it may be estimated by the method itself. This approach requires a further, e.g. a third set of measurements of values of yaw rate, left wheel speed and right wheel speed and lateral acceleration. The above relationship in combination with three complete set of measurements allows to statistically determine an estimate for the three unknowns, namely left absolute wheel roll radius, right absolute wheel roll radius and vertical compression value. The determination of a vertical compression value by the method may be of great value. In particular, the current wheel compression constant can be deduced and used for further applications, such as indirect tire pressure monitoring systems.

A vertical compression value estimated according to a method as disclosed herein may be used for various applications. For instance, in indirect tire pressure monitoring systems, it is preferred not to use relative roll radius estimates to detect load-change-induced pressure changes. In particular, a loaded wheel has a smaller roll radius as compared to an unloaded wheel. Differentiation between a highly loaded wheel and a wheel with deflated tire may not be unambiguous. Typically, an estimate of vehicle load may be used to remove load effects. For improved accuracy of not only the load estimate but also wheel or tire compression (due to this load), knowledge of a vertical compression value before the load change is desirable.

FIG. 4 schematically illustrates a side view of a vehicle 10 comprising an apparatus 30 and a yaw rate sensor 36. The vehicle comprises four wheels, two of which are shown in this side view and one of which, the rear left wheel, is designated by reference numeral 12. Wheel 12 is equipped with a wheel speed sensor 32. The wheel speed sensor 32 may be a cogged wheel with optical or magnetic readout of the rotation speed of the cogs, as used for instance for anti-lock braking systems. Other wheel speed sensors may equally be used, provided that they emit signals indicative of an angular velocity of the wheel. In the illustrated case, rear right wheel (not shown) is also equipped with a wheel speed sensor (not shown).

Yaw rate sensor 36 may be a gyroscope with at least one axis of rotation, namely yaw mode detection. Yaw mode gyroscopes are configured to detect rotations of the vehicle around a vertical axis. The illustrated yaw rate sensor is a gyroscope with three-axis detection, i.e. detection of rotations in yaw, roll and/or pitch mode. Without restriction, examples of gyroscopes include micromechanical ones operating based on Coriolis forces. Other examples yaw rate sensors may equally be used, provided that they emit signals indicative of a yaw rate of the vehicle. In some examples, the yaw rate sensor may be combined with an accelerometer, e.g. for detecting a lateral acceleration of the vehicle.

Apparatus 30 is an apparatus to estimate absolute wheel roll radii. Apparatus 30 receives signals from the wheel speed sensors 32 and yaw rate sensor 36. Apparatus 30 comprises a processing part, the processing part configured to carry out the steps of a method as described with respect to the embodiments. Alternatively or additionally, Apparatus 30 may be to estimate vertical compression value of wheels 12 of vehicle 10.

FIG. 5 schematically illustrates an apparatus 30 to estimate absolute wheel roll radii. Apparatus 30 comprises a processing part 31, the processing part 31 configured to carry out the steps of a method as described with respect to the embodiments.

In addition, FIG. 5 illustrates a first wheel speed sensor 32 for measuring first wheel speed signals, indicative of an angular velocity of a first wheel of a vehicle and a second wheel speed sensor 34 for measuring second wheel speed signals, indicative of an angular velocity of a second wheel of the vehicle. Further, a yaw rate sensor 36 for measuring yaw rate signals indicative of a yaw rate of the vehicle is shown.

The sensors 32, 34 and 36 are shown as not being comprised by the apparatus. However, in some embodiments, at least one of the sensors may be comprised by the apparatus. In some embodiments, the apparatus and at least one of the sensors may form a system to estimate absolute wheel roll radii.

FIG. 6 illustrates a flow diagram of a method 60 of estimating absolute wheel roll radii of wheels of a vehicle. The method 60 comprises a step of first measurements 62. The first measurements 62 include measuring a yaw rate signal, indicative of a yaw rate of the vehicle, measuring a wheel speed signal, indicative of an angular velocity of a first wheel of the vehicle, as well as measuring a further wheel speed signal, indicative of an angular velocity of a second wheel of the vehicle. The first measurements 62 may be carried out in a synchronized manner, for example simultaneously or concurrently.

The method 60 further comprises a step of second measurements 64. The second measurements 64 include measuring a further yaw rate signal, indicative of a further yaw rate of the vehicle, measuring a further wheel speed signal, indicative of a further angular velocity of the first wheel of the vehicle, as well as measuring a further wheel speed signal, indicative of a further angular velocity of the second wheel of the vehicle. The second measurements 64 may be carried out in a synchronized manner, for example simultaneously or concurrently.

The step of first measurements 62 and the step of second measurements 64 may be directly consecutively or may be separated by a certain duration in time.

The method 60 comprises a determination 66 of absolute wheel roll radii. Determination 66 is based on the first measurements 62 and second measurements 64.

FIG. 7 illustrates a flow diagram of a method 70 of estimating a vertical compression value of a wheel of a vehicle. The method 70 comprises a measurement step 72. The measurements 72 include measuring a yaw rate signal, indicative of a yaw rate of the vehicle, measuring a wheel speed signal, indicative of an angular velocity of a first wheel of the vehicle, as well as measuring a further wheel speed signal, indicative of an angular velocity of a second wheel of the vehicle and measuring a lateral acceleration signal, indicative of a lateral acceleration of the vehicle. The first measurements 72 are carried out in a synchronized manner, for example simultaneously or concurrently.

The method 70 also comprises a determination 74 of the vertical compression value. Determination 74 is based on the first measurements 72 and based on received absolute wheel roll radii. The absolute wheel roll radii are received as a first wheel roll radius signal, indicative of an absolute wheel roll radius of the first wheel, and a second absolute wheel roll radius signal, indicative of an absolute wheel roll radius of the second wheel.

FIG. 8 illustrates a flow diagram of a method 80 of estimating absolute wheel roll radii and a vertical compression value of wheels of a vehicle.

The method 80 comprises a first measurement step 81. The measurements 81 include measuring a yaw rate signal, indicative of a yaw rate of the vehicle, measuring a wheel speed signal, indicative of an angular velocity of a first wheel of the vehicle, as well as measuring a further wheel speed signal, indicative of an angular velocity of a second wheel of the vehicle and measuring a lateral acceleration signal, indicative of a lateral acceleration of the vehicle.

In the second measurement step 82, the values of same set of quantities at a later point in time are collected. Similarly, the third measurement step 83 collects the values of the set of quantitates at still a further point in time.

Based on the three set of measurements 81, 82 and 83, absolute roll radii are determined (reference numeral 86) and a vertical compression value is determined (reference numeral 88). Steps 86 and 88 are illustrated as being carried out simultaneously. However, as will be apparent to the skilled person, these steps may be carried out sequentially, simultaneously, independently or any combination thereof.

The invention claimed is:

1. A method of estimating absolute wheel roll radii of wheels of a vehicle, comprising:
measuring at least two yaw rate signals, each indicative of a yaw rate of the vehicle;
measuring at least two first wheel speed signals, each indicative of an angular velocity of a first wheel of the vehicle;
measuring at least two second wheel speed signals, each indicative of an angular velocity of a second wheel of the vehicle; and
determining a first absolute wheel roll radius of the first wheel and a second absolute wheel roll radius of a second wheel based on the at least two measured yaw rate signals, the at least two measured first wheel speed signals, and the at least two measured second wheel speed signals.

2. The method of claim 1, wherein the determining is further based on a relationship according to:

$$\dot{\Psi}_m = \frac{r_l \omega_l - r_r \omega_r}{B} + K$$

wherein $\dot{\Psi}_m$ denotes a yaw rate, $r_l$ denotes a first absolute wheel roll radius, $r_r$ denotes a second absolute wheel roll radius, $\omega_l$ denotes a first wheel speed, $\omega_r$ denotes a second wheel speed, B denotes an axle width, and K denotes an offset constant.

3. The method of claim 1, further comprising:
measuring at least two lateral acceleration signals, each indicative of a lateral acceleration of the vehicle;
wherein the determining is further based on a wheel compression value and the at least two measured lateral acceleration signals.

4. The method of claim 3, wherein the determining is further based on a relationship according to:

$$\dot{\Psi}_m = \frac{(r_l - a_y C)\omega_l - (r_r + a_y C)\omega_r}{B} + K$$

wherein $\dot{\Psi}_m$ denotes a yaw rate, $r_l$ denotes a first absolute wheel roll radius, $r_r$ denotes a second absolute wheel roll radius, $\omega_l$ denotes a first wheel speed, $\omega_r$ denotes a second wheel speed, B denotes an axle width, $a_y$ denotes a lateral acceleration of the vehicle, C denotes a wheel compression value and K donates an offset constant.

5. The method of claim 1, wherein the determining is performed without using a nominal wheel radius of a wheel of the vehicle.

6. The method of claim 1, wherein the determining comprises a statistical regression analysis, including at least one of (i) a recursive estimation such as a Kalman filter, or (ii) a batch analysis such as a least-squares-fit of a relationship between the at least two measured yaw rate signals, the at least two measured first wheel speed signals, and the at least two measured second wheel speed signals.

7. The method of claim 1, wherein the second absolute wheel roll radius is determined based on the determined first absolute wheel roll radius and a proportionality factor.

8. The method of claim 1, wherein at least one of:
measuring the at least two yaw rate signals,
measuring the at least two first wheel speed signals, or
measuring the at least two second wheel speed signals is performed as a time series.

9. The method of claim 1, wherein the determining is carried out without using at least one of the following:
a velocity signal, indicative of the velocity of the vehicle, or
a GPS signal.

10. The method of claim 1, further comprising:
receiving at least one accessory signal from an accessory sensor;
wherein the determining is further based on the at least one accessory signal; and
wherein the at least one accessory signal is indicative of at least one of the following:
engine torque, specific axle/wheel torque, wheel slip, engine RPM, longitudinal acceleration, load of the vehicle, axle height, suspension pressure, ambient temperature, steering wheel angle, a tire type, an estimated friction potential, a normalized traction force on the wheel, a friction related value, a brake pressure, a tire temperature, a suspension height, a control flag register.

11. The method of claim 1, wherein the first wheel and the second wheel are rear wheels, or wherein the first wheel and the second wheel are front wheels.

12. A method of estimating a vertical compression value of a wheel of a vehicle, comprising:
measuring a yaw rate signal, indicative of a yaw rate of the vehicle;
measuring a first wheel speed signal, indicative of an angular velocity of a first wheel of the vehicle;
measuring a second wheel speed signal, indicative of an angular velocity of a second wheel of the vehicle;
measuring a lateral acceleration signal, indicative of a lateral acceleration of the vehicle;
obtaining a first absolute wheel roll radius signal, indicative of an absolute wheel roll radius of the first wheel, and obtaining a second absolute wheel roll radius signal, indicative of an absolute wheel roll radius of the second wheel; and
determining a vertical compression value of at least the first wheel based on the measured yaw rate signal, the measured first wheel speed signal and the measured second wheel speed signal, the measured lateral acceleration signal, the obtained first absolute wheel roll radius signal, and the obtained second absolute wheel roll radius of the second wheel.

13. The method of claim 12, wherein the first absolute wheel roll radius of the first wheel and second absolute wheel roll radius of the second wheel are estimated based on the measured yaw rate signals, the measured first wheel speed signal and the measured second wheel speed signal, the measured lateral acceleration signal, the obtained first absolute wheel roll radius signal, and the obtained second absolute wheel roll radius of the second wheel.

14. The method of claim 12, wherein the determining is further based on a relationship according to:

$$\dot{\Psi}_m = \frac{(r_l - a_y C)\omega_l - (r_r + a_y C)\omega_r}{B} + K$$

wherein $\dot{\Psi}_m$ denotes a yaw rate, $r_l$ denotes a first absolute wheel roll radius, $r_r$ denotes a second absolute wheel roll radius, $\omega_l$ denotes a first wheel speed, $\omega_r$ denotes a second wheel speed, B denotes an axle width, $a_y$ denotes a lateral acceleration of the vehicle, C denotes a wheel compression value and K donates an offset constant.

15. A computing device to estimate absolute wheel roll radii and or a vertical compression value of wheels of a vehicle, the computing device comprising:

one or more processors; and
a memory storing instructions that, when executed by the one or more processors, cause the computing device to:
    measure at least two yaw rate signals, each indicative of a yaw rate of the vehicle;
    measure at least two first wheel speed signals, each indicative of an angular velocity of a first wheel of the vehicle;
    measure at least two second wheel speed signals, each indicative of an angular velocity of a second wheel of the vehicle; and
    determine a first absolute wheel roll radius of the first wheel and a second absolute wheel roll radius of a second wheel based on the at least two measured yaw rate signals, the at least two measured first wheel speed signals, and the at least two measured second wheel speed signals.

\* \* \* \* \*